US012278041B2

(12) United States Patent
Kim

(10) Patent No.: US 12,278,041 B2
(45) Date of Patent: Apr. 15, 2025

(54) COIL COMPONENT

(71) Applicant: SAMSUNG ELECTRO-MECHANICS CO., LTD., Suwon-si (KR)

(72) Inventor: Soo Yeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 778 days.

(21) Appl. No.: 17/361,659

(22) Filed: Jun. 29, 2021

(65) Prior Publication Data

US 2022/0216002 A1 Jul. 7, 2022

(30) Foreign Application Priority Data

Jan. 5, 2021 (KR) ........................ 10-2021-0000990

(51) Int. Cl.
*H01F 27/28* (2006.01)
*H01F 17/04* (2006.01)
*H01F 27/29* (2006.01)
*H01F 27/32* (2006.01)

(52) U.S. Cl.
CPC ........... *H01F 27/292* (2013.01); *H01F 17/04* (2013.01); *H01F 27/323* (2013.01)

(58) Field of Classification Search
CPC ...... H01F 27/292; H01F 17/04; H01F 27/323; H01F 2017/048; H01F 17/0013; H01F 27/28; H01F 27/30; H01F 27/306; H01F 27/2804; H01F 2027/2809
USPC ........................................ 336/200, 232, 198
See application file for complete search history.

(56) References Cited

U.S. PATENT DOCUMENTS 6,600,404 B1 * 7/2003 Kajino ................. H05K 1/0265 336/200
2005/0184848 A1 * 8/2005 Yoshida ................ H01F 41/046 336/223
2014/0009254 A1 * 1/2014 Ohkubo .............. H01F 17/0033 336/192
2015/0035640 A1 * 2/2015 Wang .................... H01F 41/042 336/200
2015/0270053 A1 * 9/2015 Cha ......................... H01F 17/04 336/192

(Continued)

FOREIGN PATENT DOCUMENTS

KR 10-2016-0033462 A 3/2016

*Primary Examiner* — Shawki S Ismail
*Assistant Examiner* — Kazi S Hossain
(74) *Attorney, Agent, or Firm* — Morgan, Lewis & Bockius LLP

(57) ABSTRACT

A coil component includes a body, a support substrate, a coil portion on one surface of the support substrate, and first and second external electrodes disposed on the body and connected to the coil portion. 100 μm≤0.5*b*tan θ, where, on a cross-section perpendicular to the one surface of the support substrate, P1 is a point among points at which an outline of one coil turn and the support substrate intersect, P2 is a point among points at which an outline of an adjacent coil turn and the support substrate intersect, P3 is a point among points of the one coil turn having a maximum line width, 'a' is a length of a first virtual segment connecting P1 to P3, 'b' is a length of a second virtual segment connecting P1 to P2, and θ is an angle defined by the first and second virtual segments.

20 Claims, 7 Drawing Sheets

(56) References Cited

U.S. PATENT DOCUMENTS

| | | | | |
|---|---|---|---|---|
| 2016/0086720 | A1 | 3/2016 | Jeong | |
| 2016/0163444 | A1 * | 6/2016 | Choi | H01F 41/043 336/200 |
| 2017/0004917 | A1 * | 1/2017 | Yang | C23F 1/02 |
| 2017/0372832 | A1 * | 12/2017 | Choi | H01F 27/2804 |
| 2018/0166194 | A1 * | 6/2018 | Choi | H01F 5/04 |
| 2019/0122811 | A1 * | 4/2019 | Jung | H01F 5/06 |

* cited by examiner

COIL COMPONENT

CROSS-REFERENCE TO RELATED APPLICATION(S)

The present application claims the benefit of priority to Korean Patent Application No. 10-2021-0000990, filed on Jan. 5, 2021 in the Korean Intellectual Property Office, the entire disclosure of which is incorporated herein by reference.

BACKGROUND

1. Field

The present disclosure relates to a coil component.

2. Description of Related Art

An inductor, a coil component, is a typical passive electronic component used in electronic devices, along with a resistor and a capacitor.

A thin film type inductor is manufactured by forming a coil portion on a substrate through a plating process, forming and curing a resin composite, in which a filler and a resin are mixed, on the substrate to manufacture a component body, and forming an external electrode on an external surface of the component body.

SUMMARY

An aspect of the present disclosure is to provide a coil component in which when a coil portion is formed through a plating process, a plating growth angle of a plating layer is controlled such that the coil portion has a height of 100 μm or more.

According to an aspect of the present disclosure, a coil component includes a body, a support substrate disposed in the body, a coil portion having at least one turn on one surface of the support substrate, and a first external electrode and a second external electrode disposed on the body to be spaced apart from each other and respectively connected to the coil portion. $100\ \mu m \leq 0.5*b*\tan\theta$, where, on a cross-section perpendicular to the one surface of the support substrate, 'P1' is a point among points at which an outline of a first turn of the coil portion and the one surface of the support substrate intersect, 'P2' is a point facing the point P1 among points at which an outline of a second turn adjacent to the first turn and the one surface of the support substrate intersect, 'P3' is a point, facing the second turn, on the outline of the first turn among points at which the first turn has a maximum line width, 'a' is a length of a first virtual segment connecting the points P1 and P3 to each other, 'b' is a length of a second virtual segment connecting the points P1 and P2 to each other, and θ is an angle defined by the first and second virtual segments.

According to another aspect of the present disclosure, a coil component includes a body; a support substrate disposed in the body; a coil portion having at least one turn on one surface of the support substrate; and a first external electrode and a second external electrode disposed on the body to be spaced apart from each other and respectively connected to the coil portion. A portion of the at least one turn of the coil portion, that is in contact with the support substrate, has a side surface angled less than 90° with the one surface of the support substrate.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
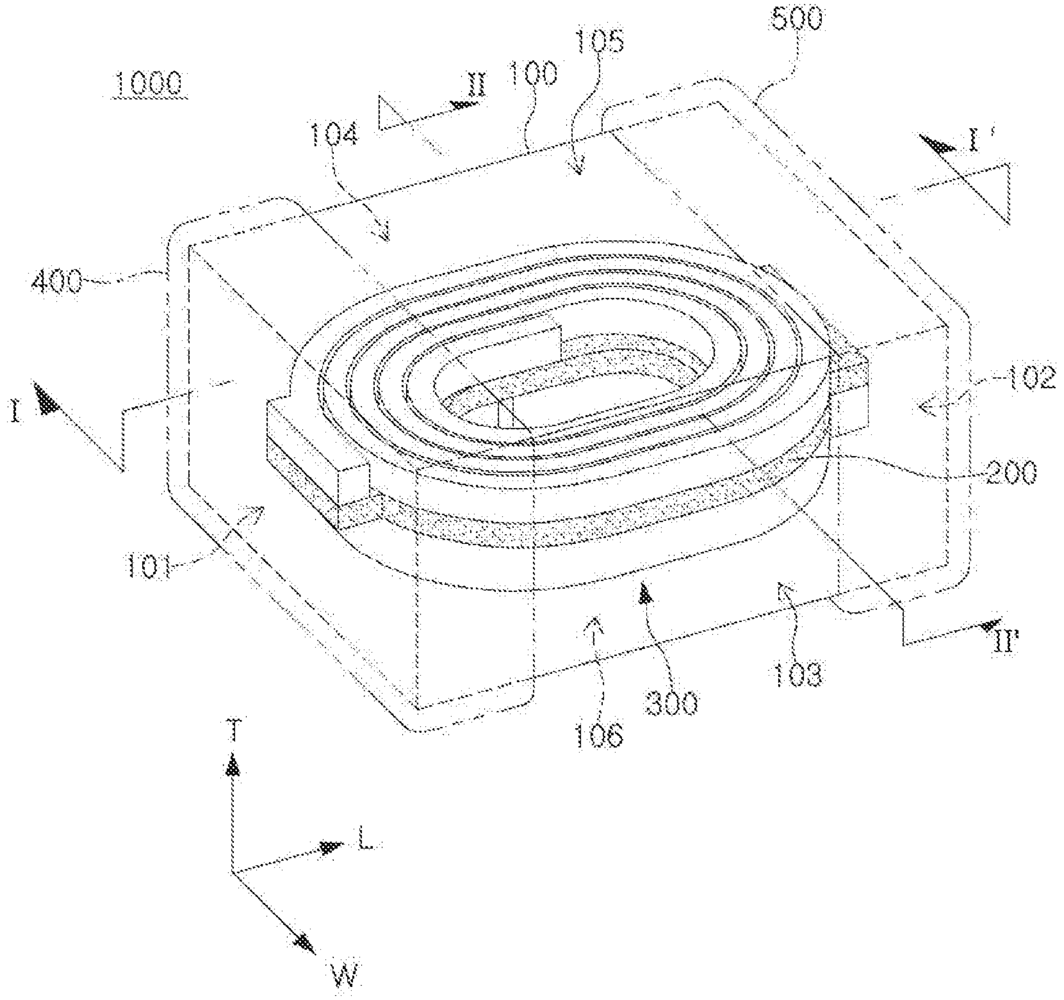
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
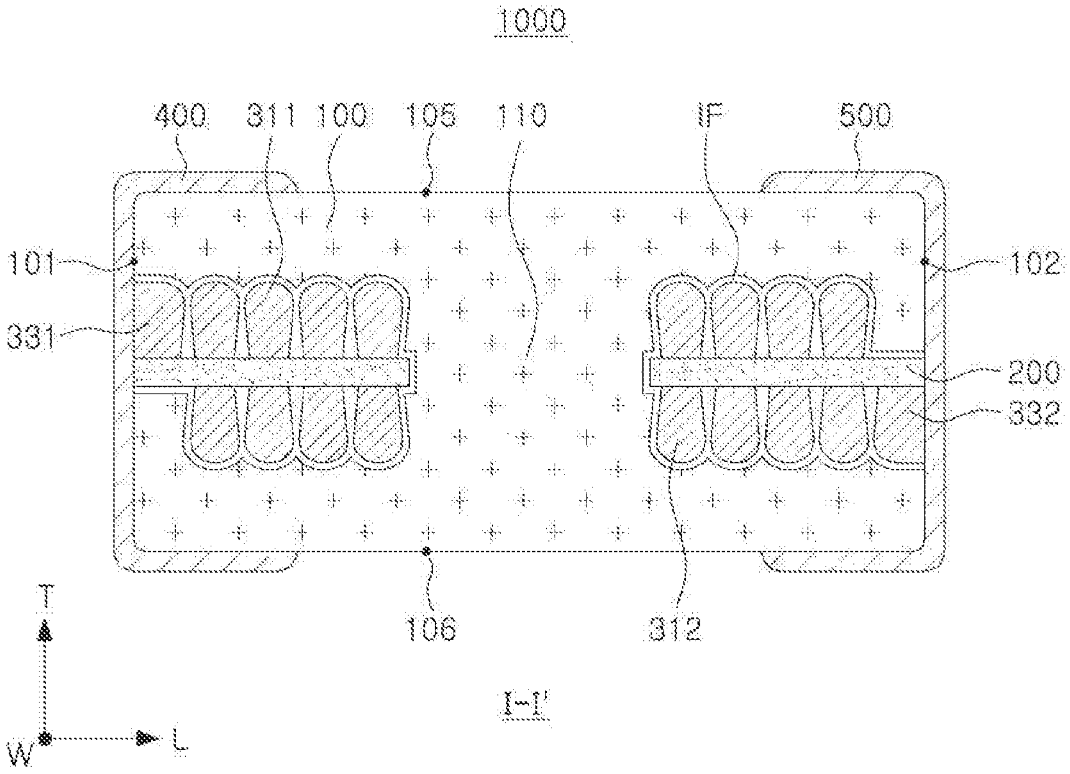
FIG. 2 is a cross-sectional view taken along line I-I' of FIG. 1.
Figure 3:
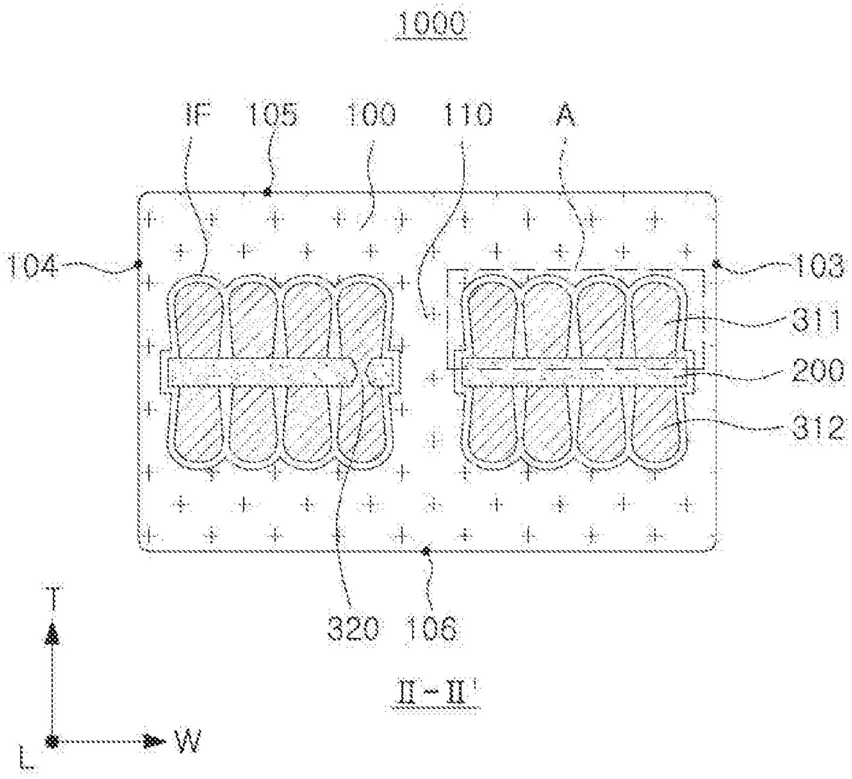
FIG. 3 is a cross-sectional view taken along line II-II' of FIG. 1.
Figure 4:
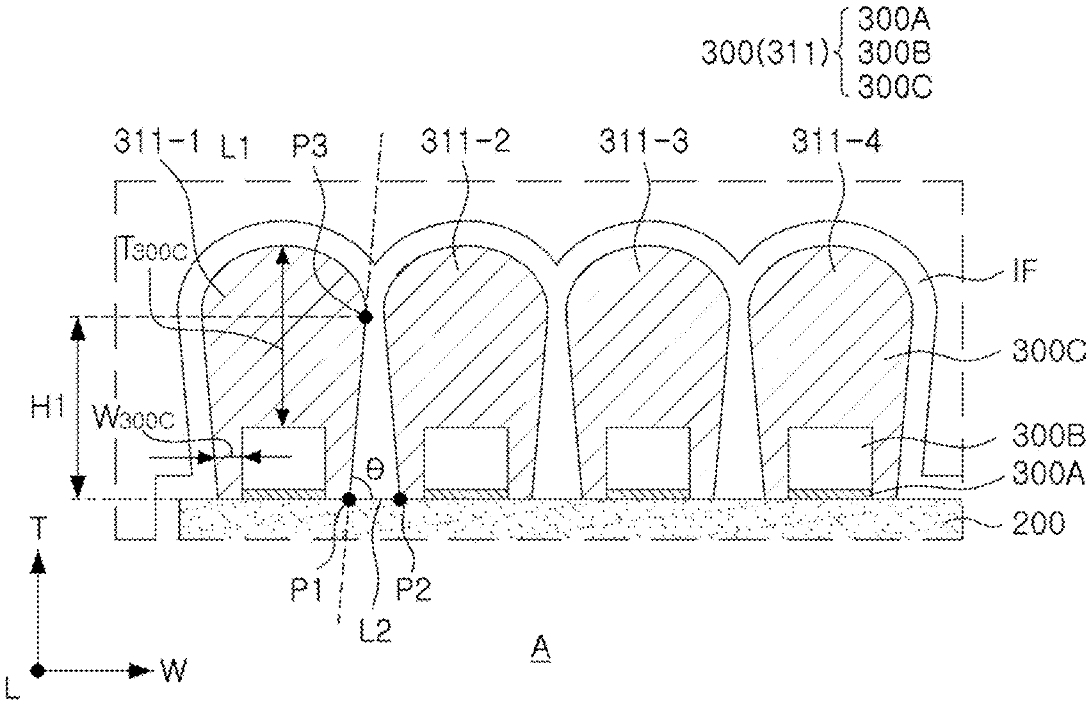
FIG. 4 is a schematic enlarged view illustrating an example of portion 'A' of FIG. 3.

FIG. 1 is a schematic perspective view of a coil component according to an exemplary embodiment. FIG. 2 is a cross-sectional view taken along line I-I' of FIG. 1. FIG. 3 is a cross-sectional view taken along line II-II' of FIG. 1. FIG. 4 is a schematic enlarged view illustrating an example of portion 'A' of FIG. 3.

Referring to FIGS. 1 to 4, a coil component 1000 according to an exemplary embodiment may include a body 100, a support substrate 200, a coil portion 300, external electrodes 400 and 500, and an insulating film IF.

The body 100 may form an exterior of the coil component 1000 according to the present embodiment, and may have the coil portion 300 and the support substrate 200 embedded therein.

The body 100 may be formed to have an overall hexahedral shape.

Based on FIGS. 1 to 3, the body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 105 and the sixth surface 106 of the body 100. Hereinafter, both end surfaces (one end surface and the other end surface) of the body 100 may refer to the first surface 101 and the second surface 102 of the body 100, respectively, and both side surfaces (one side surface and the other side surface) of the body 100 may refer to the third surface 103 and the fourth surface 104 of the body 100, respectively. One surface of the body 100 may refer to the sixth surface 106 of the body 100, and the other surface of the body 100 may refer to the fifth surface 105 of the body 100. The sixth surface of the body 100 may be provided as a mounting surface when the coil component 1000 according to the present embodiment is mounted on a mounting substrate such as a printed circuit board (PCB).

The body 100 may be formed such that the coil component 1000, including the external electrodes 400 and 500 to be described later, has a length of 2.0 mm, a width of 1.2 mm, and a thickness of 0.65 mm, but is not limited thereto. Since the above-described sizes of the coil component 1000 are merely illustrative, cases in which a size of the coil component 1000 are smaller or larger than the above-mentioned dimensions may be not excluded from the scope of the present disclosure.

The above-described length of the coil component 1000 may refer to a maximum value, among lengths (dimensions) of a plurality of segments, connecting outermost boundary lines of the body 100, among outermost boundary lines of the coil component 1000 illustrated in a cross-sectional image, and parallel to a length (L) direction of the body 100, based on an optical microscope or scanning electron microscope (SEM) image for a cross-section of the body 100 in a length-thickness (L-T) direction in a central portion of the body 100 in a width (W) direction. Alternatively, the length of the coil component may refer to arithmetic means of lengths (dimensions) of at least two segments, among a plurality of segments connecting outermost boundary lines of the coil component 1000 illustrated in the cross-sectional image, and parallel to the length (L) direction of the body 100.

The above-described thickness of the coil component 1000 may refer to a maximum value, among thicknesses (dimensions) of a plurality of segments, connecting outermost boundary lines of the body 100, among outermost boundary lines of the coil component 1000 illustrated in a cross-sectional image, and parallel to a thickness (T) direction of the body 100, based on an optical microscope or scanning electron microscope (SEM) image for a cross-section of the body 100 in a length-thickness (L-T) direction in a central portion of the body 100 in a width (W) direction. Alternatively, the length of the coil component may refer to arithmetic means of thicknesses (dimensions) of at least two segments, among a plurality of segments connecting outermost boundary lines of the coil component 1000 illustrated in the cross-sectional image, and parallel to the thickness (T) direction of the body 100.

The above-described width of the coil component 1000 may refer to a maximum value, among widths (dimensions) of a plurality of segments, connecting outermost boundary lines of the body 100, among outermost boundary lines of the coil component 1000 illustrated in a cross-sectional image, and parallel to a width (W) direction of the body 100, based on an optical microscope or scanning electron microscope (SEM) image for a cross-section of the body 100 in a length-thickness (L-T) direction in a central portion of the body 100 in a width (W) direction. Alternatively, the length of the coil component may refer to arithmetic means of widths (dimensions) of at least two segments, among a plurality of segments connecting outermost boundary lines of the coil component 1000 illustrated in the cross-sectional image, and parallel to the width (W) direction of the body 100.

Alternatively, each of the length, the width, and the thickness of the coil component 1000 may be measured by a micrometer measurement method. In the micrometer measurement method, measurement may be performed by setting a zero point using a micrometer (instrument) with gauge repeatability and reproducibility (R&R), inserting the coil component 1000 inserted between tips of the micrometer, and turning a measurement lever of the micrometer. When the length of the coil component 1000 is measured by a micrometer measurement method, the length of the coil component 1000 may refer to a value measured once or an arithmetic mean of values measured two or more times. This may be equivalently applied to the width and the thickness of the coil component 1000.

The body 100 may include an insulating resin and a filler dispersed in the insulating resin. The filler may be a dielectric material or a magnetic material. The magnetic material may be ferrite or magnetic metal powder particles. The dielectric material may be an organic filler or an inorganic filler. For example, the body 100 may be formed laminating one or more magnetic composite sheets in which magnetic metal powder particles are dispersed in an insulating resin.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The magnetic metal powder particle may be amorphous or crystalline. For example, the magnetic metal powder particle may be a Fe—Si—B—Cr-based amorphous alloy powder, but is not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

Each of the fillers may have an average diameter of about 0.1 μm to 30 μm, but is not limited thereto.

The body 100 may include two or more types of filler dispersed in a resin. The term "different types of filler" means that the fillers, dispersed in the resin, are distinguished from each other by at least one of average diameter, composition, crystallinity, shape, and magnetic characteristics (for example, whether they have the same permeability).

Hereinafter, a filler will be assumed as being magnetic metal powder particles for ease of description, but the present disclosure is not limited to the body 100 having a structure in which magnetic metal power particles are disposed in an insulating resin.

The insulating resin may include epoxy, polyimide, liquid crystal polymer, or the like, in a single or combined form, but is not limited thereto.

The body 100 may include a core 110 penetrating through the support substrate 200 and the coil portion 300 to be described later. The core 110 may be formed by filling a central portion of each of the coil portion 300 and the support substrate 200 with a magnetic composite sheet, but the present disclosure is not limited thereto.

The support substrate 200 may be embedded in the body 100. The support substrate 200 may support the coil portion 300 to be described later.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photo-imageable dielectric (PID) film, and the like, but are not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide more improved rigidity. When the support substrate 200 is formed of an insulating material including no glass fiber, the support substrate 200 is advantageous for thinning the coil component 1000. In addition, the effective volume of the coil portion 300 and/or the magnetic material may be increased, based on a component having the same volume, to improve component characteristics. When the support substrate 200 is formed of an insulating material including a photosensitive insulating resin, the number of processes for forming the coil portion 300 may be decreased. Therefore, it may be advantageous in reducing production costs, and a fine via may be formed.

The coil portion 300 may be disposed in the body 100 to express characteristics of the coil component 1000. For example, when the coil component 1000 is used as a power inductor, the coil portion 300 may store an electric field as a magnetic field to maintain an output voltage, serving to stabilize power of an electronic device.

The coil portion 300 may include coil patterns 311 and 312, vias 320, and lead-out patterns 331 and 332.

Specifically, based on directions of FIGS. 1 to 3, a first coil pattern 311 and a second lead-out pattern 331 may be disposed on an upper surface of the support substrate 200 facing the fifth surface 105 of the body 100, and a second coil pattern 312 and a second lead-out pattern 332 may be disposed on a lower surface of the support substrate 200 facing the upper surface of the support substrate 200.

Referring to FIGS. 1 to 3, the first coil pattern 311 may be in contact with and connected to the first lead-out pattern 331 on the upper surface of the support substrate 200. The second coil pattern 312 may be in contact with and connected to the second lead-out pattern 332 on the lower surface of the support substrate 200. The via 320 may penetrate through the support substrate 200 to be in contact with and connected to an internal end portion of each of the first coil pattern 311 and the second coil pattern 312. The first lead-out pattern 331 may be exposed to the first surface 101 of the body 100 to be is in contact with and connected to the first external electrode 400, to be described later, disposed on the first surface 101 of the body 100. The second lead-out pattern 332 may be exposed to the second surface 102 of the body 100 to be in contact with and connected to the second external electrode 500, to be described later, disposed on the second surface 101 of the body 100. Therefore, the coil portion 300 may function as a single coil connected between the first external electrode 400 and the second external electrode 500 in series.

Each of the first coil pattern 311 and the second coil pattern 312 may be in the form of a planar spiral in which at least one turn is formed around the core 110. For example, the first coil pattern 311 may form at least one turn around the core 110 on the upper surface of the support substrate 200.

The coil portion 300 may include at least three conductive layers 300A, 300B, and 300C. Specifically, the coil portion 300 may includes a conductive thin film 300A disposed on the support substrate 200, a conductive pattern layer 300B disposed on the conductive thin film 300A to be spaced apart from the support substrate 200, and an upper conductive layer 300C disposed on the conductive pattern layer 300B to cover at least a portion of a side surface of the conductive pattern layer 300B. In the present embodiment, the upper conductive layer 300C may cover a side surface of each of the conductive thin film 300A and the conductive pattern layer 300B to be in contact with the support substrate 200. Since the coil portion 300 has the coil patterns 311 and 312, the vias 320, and lead-out patterns 331 and 332, each of the coil patterns 311 and 312, the vias 320, and the lead-out patterns 331 and 332 may include first to upper conductive layers 300A, 300B, and 300C. Hereinafter, only the first coil pattern 311 will be described with reference to FIG. 4, but each of the second coil pattern 312, the first and second lead-out patterns 331 and 332, and the via 320 may also include first to third upper conductive layers 300A, 300B, and 300C to be described in the first coil pattern 311.

Referring to FIG. 4, each turn of the first coil pattern 311 may include a conductive thin film 300A disposed on the upper surface of the support substrate 200, a conductive pattern layer 300B disposed on the conductive thin film 300A and spaced apart from the support substrate 200, and an upper conductive layer 300C disposed on the conductive pattern layer 300B to cover a side surface of each of the conductive thin film 300A and the conductive pattern layer 300B to be in contact with the support substrate 200.

The conductive thin film 300A may be a seed layer for forming the conductive pattern layer 300B through a plating process. The conductive thin film 300A may include, for example, at least one of copper (Cu), molybdenum (Mo), nickel (Ni), titanium (Ti), and chromium (Cr). As an example, the conductive thin film 300A may be formed by vapor deposition such as sputtering, and may include molybdenum (Mo). As another example, the thin conductive layer 300A may be formed by electroless plating, and may include copper (Cu). A thickness of the thin conductive layer 300A may be 5 μm or less. When the thickness of the thin conductive layer 300A is greater than 5 μm, it is uneconomical. The length of the conductive thin film 300A may refer to a maximum value, among lengths (dimensions) of a plurality of segments, connecting two boundary lines opposing each other in a length (L) direction of the body 100, among outermost boundary lines of the conductive thin film 300A illustrated in a cross-sectional image, and parallel to the length (L) direction of the body 100, based on an optical microscope or scanning electron microscope (SEM) image for a cross section of the body 100 in a length-thickness (L-T) direction in a central portion of the body 100 in a width (W) direction. Alternatively, the length of the coil component may refer to a minimum value, among lengths (dimensions) of a plurality of segments connecting two boundary lines opposing each other in a length (L) direction, among outermost boundary lines of the conductive thin film 300A illustrated in the cross-sectional image, and parallel to the length (L) direction of the body 100. Alternatively, the length of the coil component may refer to arithmetic means of at least three segments, among a plurality of segments connecting two boundary lines opposing each other in a length (L) direction, among outermost boundary lines of the conductive thin film 300A illustrated in the cross-sectional image, and parallel to the length (L) direction of the body 100. In calculation of the thickness of the conductive thin film 300A using the above-described method, when the coil portion 300 has a plurality of turns, the thickness of the conductive thin film 300A may be calculated by applying the above-described method to the conductive thin film 300A of one turn. In addition, a thickness of the conductive thin film 300A in each of the turns may be calculated using the above-described method, and the calculated thicknesses may be arithmetically averaged to calculate a thickness of the conductive thin film 300A.

The conductive pattern layer 300B may be disposed on the thin conductive layer 300A, and may be spaced apart from the support substrate 200. For example, the conductive pattern layer 300B may be disposed to be in contact with the conductive thin film 300A in the form of exposing a side surface of the conductive thin film 300A. As an example, the conductive thin film 300A may be formed by forming a metal layer fora conductive thin film on an entire upper surface of the support substrate 200, forming an opening-patterned plating resist on the metal layer, removing the plating resist from the upper surface of the support substrate 200, and removing a portion exposed externally by removing the plating resist of the metal layer. The conductive thin film 300A and the conductive pattern layer 300B may be formed by such an exemplary manufacturing process, so that the conductive pattern layer 300B may expose a side surface of the conductive thin film 300A to be spaced apart from the support substrate 200.

The conductive pattern layer 300B may be formed by electroplating using the thin conductive layer 300A as a seed layer. The conductive pattern layer 300B may include at least one of, for example, copper (Cu), aluminum (Al), silver (Ag), gold (Au), tin (Sn), molybdenum (Mo), nickel (Ni), titanium (Ti), and chromium (Cr). The conductive pattern layer 300B may include a metal different from the conductive thin film 300A. In this case, during a process of removing the above-described metal layer (a configuration to be the conductive thin film 300A in a subsequent process, as described above), only the metal layer may be selectively removed to significantly reduce conductor loss of the pattern plating layer 300A, but the present disclosure is not limited thereto. A lower surface of the conductive pattern layer 300B, disposed to be in contact with the conductive thin film 300A, may have the same area of an upper area of the conductive pattern layer 300B. For example, the conductive pattern layer 300B may have a rectangular cross-sectional shape based on a cross-section perpendicular to one surface of the support substrate 200 (for example, a cross-section in a width-thickness (W-T) direction, as illustrated in FIGS. 3 and 4).

The upper conductive layer 300C may be disposed on the conductive pattern layer 300B to cover a side surface of each of the conductive thin film 300A and the conductive pattern layer 300B to be in contact with the support substrate 200. The upper conductive layer 300C may be formed by electroplating using the conductive pattern layer 300B as a seed layer. In the upper conductive layer 300C, a thickness (dimension) $T_{300C}$ of a region disposed on the upper surface of the conductive pattern layer 300B may be greater than a width (dimension) $W_{300C}$ of a region disposed on a side surface of the conductive pattern layer 300B. For example, the upper conductive layer 300C may have an anisotropic shape in which a growth in a horizontal direction is greater than a growth in a vertical direction. Due to the anisotropic shape of the upper conductive layer 300C, a cross-sectional area of a conductor constituting the coil portion 300 may be further increased while preventing a short-circuit from occurring between adjacent turns of a final coil formed to the upper conductive layer 300C. For example, the upper conductive layer 300C may be formed by anisotropically plating the conductive pattern layer 300B. In this case, the total number of processes may be decreased based on the thickness of the final coil. For example, when a thickness of the final coil is implemented to be greater than 100 μm, in the case in which the final coil is implemented by pattern plating using a plating resist, at least two plating resists and at least two plating processes are required due to the limitations of the current technology. However, in the present embodiment, the conductive pattern layer 300B may be formed by pattern plating using a plating resist and the upper conductive layer 300C may be formed by anisotropic plating using the conductive pattern layer 300B as a seed layer, so that at least one plating resist lamination, exposure, and development process may be omitted, as compared with the related art.

A thickness (dimension) of the region, disposed on an upper surface of the conductive pattern layer 300B, of the upper conductive layer 300C may refer to a maximum value, among lengths (dimensions) of a plurality of segments, connecting a boundary line corresponding to an upper surface of the conductive pattern layer 300B and a boundary line corresponding to an upper surface of the upper conductive layer 300C to each other in the thickness (T) direction, based on an optical microscope or scanning electron microscope (SEM) image for a cross section of the body 100 in a length-thickness (L-T) direction in a central portion of the body 100 in a width (W) direction. Alternatively, the thickness (dimension) of the region, disposed on an upper surface of the conductive pattern layer 300B may refer to a minimum value, among lengths (dimensions) of a plurality of segments, connecting a boundary line corresponding to an upper surface of the conductive pattern layer 300B and a boundary line corresponding to an upper surface of the upper conductive layer 300C to each other in the thickness (T) direction, based on the optical microscope or scanning electron microscope (SEM) image. Alternatively, the thickness (dimension) of the region, disposed on an upper surface of the conductive pattern layer 300B may refer to arithmetic means of at least two segments, among lengths (dimensions) of a plurality of segments, connecting a boundary line corresponding to an upper surface of the conductive pattern layer 300B and a boundary line corresponding to an upper surface of the upper conductive layer 300C to each other in the thickness (T) direction, based on the optical microscope or scanning electron microscope (SEM) image.

The upper conductive layer 300C may have a shape in which an upper side is upwardly convex in a cross-section perpendicular to the upper surface of the support substrate 200. For example, an upper surface of the upper conductive layer 300C may be a curved surface having an upwardly convex shape. On the other hand, the upper surface of the conductive pattern layer may be a substantially flat surface. In this case, since the angled portion of the upper conductive layer 300C may be significantly reduced, DC resistance Rdc of the coil portion 300 may be reduced.

The upper conductive layer 300C may include at least one of, for example, molybdenum (Mo), nickel (Ni), titanium (Ti), and chromium (Cr). In the present embodiment, the upper conductive layer 300C may be a copper anisotropic plating layer, but the present disclosure is not limited thereto.

As an example, when the first coil pattern 311, the via 320, and the first lead-out pattern 331 are formed on the upper surface of the support substrate 200 through a plating process, the conductive thin films 300A of the via 320 and the first lead-out pattern 331 may be formed together in the same process to be integrated with each other. For example, a boundary may not be formed between the conductive thin films 300A of the first coil pattern 311, the via 320, and the first lead-out pattern 331.

When, on a cross-section perpendicular to the upper surface of the support substrate 200, 'P1' is a point among points at which an outline of a first turn of the coil portion 300 and the upper surface of the support substrate 200 intersect, 'P2' is a point facing the point P1 among points at which an outline of a second turn adjacent to the first turn and the upper surface of the support substrate 200 intersect, 'P3' is a point, facing the second turn, on the outline of the first turn among points at which the first turn has a maximum line width, 'a' is a length of a first virtual segment connecting the points P1 and P3 to each other, 'b' is a length of a second virtual segment connecting the points P1 and P2 to each other, and θ is an angle defined by the first and second virtual segments, the coil component 1000 satisfies an equation of 100 μm≤0.5*b*tan θ. Hereinafter, this will be described in detail.

Referring to FIGS. 3 and 4, the first coil pattern 311 may include a first turn 311-1, a second turn 311-2, a third turn 311-3, and a fourth turn 311-4 formed on the upper surface of the support substrate 200 in a direction toward the third surface 103 of the body 100. As an example, points P1, P2, and P3 are defined as follows: 'P1' is one point (a point disposed to the right, based on a direction of FIG. 4) of two points, formed by contacting an outline of the first turn 311-1 with the support substrate 200, 'P2' is one point (a point disposed to the left, based on the direction of FIG. 4), facing the point P1, of two points, formed by contacting an outline of a second turn 311-2 adjacent to the first turn 311-1 with the support substrate 200, and 'P3' is one point (a point disposed to the right, based on the direction of FIG. 4), facing the second turn 311-2, of two points corresponding to a region, in which the first turn 311-1 has a maximum line width, in the outline of the first turn 311-1. The points P1, P2, and P3 may be used to define two virtual segments L1 and L2, intersecting each other at the point P1, and to define a length 'a' of a first virtual segment L1 and a length 'b' of a second virtual segment L2. For example, the first virtual segment L1 having the length 'a' may be defined when connecting the points P1 and P3, and the second virtual segment L2 having the length 'b' may be defined when connecting the points P1 and P2. Since the first virtual segment L1 and the second virtual segment L2 intersect each other at the point P1, an angle formed by the first virtual segment L1 and the second virtual segment L2 at the point P1 may be defined as θ. Under the above definitions, the coil component according to the present embodiment may satisfy the equation of 100 μm≤0.5*b*tan θ.

In general, in the case in which an anisotropic plating layer is used as a final layer of a coil when the coil is formed by plating, the anisotropic plating layer has a line width increased in an upward direction, and thus, has a maximum line width at a specific height. In addition, the line width of the anisotropic plating layer tends to be smaller than the maximum line width at a height greater than the specific height. In the case of the present embodiment, an angle of an outline of each turn of the coil portion 300 may be controlled using the points P1, P2, and P3, so that a height of the coil portion 300, a final coil formed to the upper plating layer 300C, may be greater than 100 μm. In the case of the present embodiment, since the upper conductive layer 300C, an anisotropic plating layer, surrounds the entire exposed surfaces of the conductive thin film 300A and the conductive pattern layer 300B to be in contacts with the support substrate 200, the outline of each turn of the coil portion 300 may be formed by a surface of the upper conductive layer 300C.

The length 'b' of the second virtual segment L2 may be 6 μm or more and 20 μm or less. When the length 'b' of the second virtual segment L2 is less than 6 μm, the upper conductive layers 300C, final layers of the coil portion 300, may be in contact with each other in adjacent turns to cause a short-circuit between the adjacent turns. When the length 'b' of the second virtual segment L2 is greater than 20 μm, a separation space between turns of the coil portion 300 may be relatively increased, so that it may be disadvantageous in increasing the number of turns.

The angle θ formed by the first virtual segment L1 and the second virtual segment L2 may be 84.3° or more and 89.0° or less. When the angle θ formed by the first virtual segment L1 and the second virtual segment L2 is less than 84.3°, a distance between a lower side of an outline of each turn (for example, P1) and an upper side of an outline of each turn (for example, P3), for example, a distance between P1 and P3 in the width direction W of FIG. 4, may be increased to cause a short-circuit between adjacent turns. When the angle θ formed by the first virtual segment L1 and the second virtual segment L2 is greater than 89.0°, it may be difficult to be implemented using a current anisotropic plating technology.

In the present embodiment, to satisfy the equation of 100 μm≤0.5*b*tan θ, as an example, when b=6 μm, θ may be 88.3° or more and 89.0° or less. As another example, when b=8 μm, θ may be 87.7° or more and 89.0° or less. As another example, when b=10 μm, θ may be 87.2° or more and 89.0° or less. As another example, when b=12 μm, θ may be 86.6° or more and 89.0° or less. As another example, when b=14 μm, θ may be 86.0° or more and 89.0° or less. As another example, when b=16 μm, θ may be 85.5° or more and 89.0° or less. As another example, when b=18 μm, θ may be 84.9° or more and 89.0° or less. As another example, when b=20 μm, θ may be 84.3° or more and 89.0° or less.

Table 1 illustrates a change in height H1, at which each turn of a coil portion has a maximum line width when b is 6 μm, depending on θ. Refer to Table 1, when b is 6 μm, in the range in which θ is 88.3° or more to 89.0° or less, the height H1 at which each turn of the coil portion has a maximum line width may be 100 μm or more while preventing a short-circuit between turns.

TABLE 1

| θ | b/2 | a | H1 |
|---|---|---|---|
| 83.0 | 3 | 25 | 24 |
| 84.0 | 3 | 29 | 29 |
| 85.0 | 3 | 34 | 34 |
| 88.2 | 3 | 96 | 95 |
| 88.3 | 3 | 101 | 101 |
| 88.5 | 3 | 115 | 115 |
| 89.0 | 3 | 172 | 172 |

Table 2 illustrates a change in height H1, at which each turn of a coil portion has a maximum line width when b is 8 μm, depending on θ. Referring to Table 2, when b is 8 μm, in the range in which θ is 87.7° or more to 89.0° or less, the height H1 at which each turn of the coil portion has a maximum line width may be 100 μm or more while preventing a short-circuit between turns.

TABLE 2

| θ | b/2 | a | H1 |
|---|---|---|---|
| 83 | 4 | 33 | 33 |
| 84 | 4 | 38 | 38 |
| 85 | 4 | 46 | 46 |
| 86 | 4 | 57 | 57 |
| 87.7 | 4 | 100 | 100 |
| 88 | 4 | 115 | 115 |
| 89 | 4 | 229 | 229 |

Table 3 illustrates a change in height H1, at which each turn of a coil portion has a maximum line width when b is 10 μm, depending on θ. Referring to Table 3, when b is 10 μm, in the range in which θ is 87.2° or more to 89.0° or less, the height H1 at which each turn of the coil portion has a maximum line width may be 100 μm or more while preventing a short-circuit between turns.

TABLE 3

| θ | b/2 | a | H1 |
|---|---|---|---|
| 83 | 5 | 41 | 41 |
| 84 | 5 | 48 | 48 |
| 85 | 5 | 57 | 57 |
| 86 | 5 | 72 | 72 |
| 87.2 | 5 | 102 | 102 |
| 88 | 5 | 143 | 143 |
| 89 | 5 | 286 | 286 |

Table 4 illustrates a change in height H1, at which each turn of a coil portion has a maximum line width when b is 12 μm, depending on θ. Referring to Table 4, when b is 12 μm, in the range in which θ is 86.6° or more to 89.0° or less, the height H1 at which each turn of the coil portion has a maximum line width may be 100 μm or more while preventing a short-circuit between turns.

TABLE 4

| θ | b/2 | a | H1 |
|---|---|---|---|
| 83 | 6 | 49 | 49 |
| 84 | 6 | 57 | 57 |
| 85 | 6 | 69 | 69 |
| 86.6 | 6 | 101 | 101 |
| 87 | 6 | 115 | 114 |
| 88 | 6 | 172 | 172 |
| 89 | 6 | 344 | 344 |

Table 5 illustrates a change in height H1, at which each turn of a coil portion has a maximum line width when b is 14 μm, depending on θ. Referring to Table 5, when b is 14 μm, in the range in which θ is 86.0° or more to 89.0° or less, the height H1 at which each turn of the coil portion has a maximum line width may be 100 μm or more while preventing a short-circuit between turns.

TABLE 5

| θ | b/2 | a | H1 |
|---|---|---|---|
| 83 | 7 | 57 | 57 |
| 84 | 7 | 67 | 67 |
| 85 | 7 | 80 | 80 |
| 86 | 7 | 100 | 100 |
| 87 | 7 | 134 | 134 |
| 88 | 7 | 201 | 200 |
| 89 | 7 | 401 | 401 |

Table 6 illustrates a change in height H1, at which each turn of a coil portion has a maximum line width when b is 16 μm, depending on θ. Referring to Table 6, when b is 16 μm, in the range in which θ is 85.5° or more to 89.0° or less, the height H1 at which each turn of the coil portion has a maximum line width may be 100 μm or more while preventing a short-circuit between turns.

TABLE 6

| θ | b/2 | a | H1 |
|---|---|---|---|
| 83 | 8 | 66 | 65 |
| 84 | 8 | 77 | 76 |
| 85.5 | 8 | 102 | 102 |
| 86 | 8 | 115 | 114 |
| 87 | 8 | 153 | 153 |
| 88 | 8 | 229 | 229 |
| 89 | 8 | 458 | 458 |

Table 7 illustrates a change in height H1, at which each turn of a coil portion has a maximum line width when b is 18 μm, depending on θ. Referring to Table 7, when b is 18 μm, in the range in which θ is 84.9° or more to 89.0° or less, the height H1 at which each turn of the coil portion has a maximum line width may be 100 μm or more while preventing a short-circuit between turns.

TABLE 7

| θ | b/2 | a | H1 |
|---|---|---|---|
| 83 | 9 | 74 | 73 |
| 84.9 | 9 | 101 | 101 |
| 85 | 9 | 103 | 103 |
| 86 | 9 | 129 | 129 |
| 87 | 9 | 172 | 172 |
| 88 | 9 | 258 | 258 |
| 89 | 9 | 516 | 516 |

Table 8 illustrates a change in height H1, at which each turn of a coil portion has a maximum line width when b is 20 μm, depending on θ. Referring to Table 8, when b is 20 μm, in the range in which θ is 84.3° or more to 89.0° or less, the height H1 at which each turn of the coil portion has a maximum line width may be 100 μm or more while preventing a short-circuit between turns.

TABLE 8

| θ | b/2 | a | H1 |
|---|---|---|---|
| 83 | 10 | 82 | 81 |
| 84.3 | 10 | 101 | 100 |
| 85 | 10 | 115 | 114 |
| 86 | 10 | 143 | 143 |
| 87 | 10 | 191 | 191 |
| 88 | 10 | 287 | 286 |
| 89 | 10 | 573 | 573 |

In one example, a thickness, a width, and a length of an element in a coil component, or a distance between two points, disclosed in exemplary embodiments of the present disclosure, may be measured in a cross-sectional cut surface of the body 100. The cut surface may include a cut surface cut the body 100 in the first direction (X direction)-third direction (Z direction) plane, or a cut surface cut the body 100 in the first direction (X direction)-second direction (Y direction) plane. In a case that the cut surface includes a surface cut the body 100 in the first direction (X direction)-third direction (Z direction) plane, the cut surface may cut a central portion of the body 100 in the second direction (Y direction), and in a case that the cut surface includes a surface cut the body 100 in the first direction (X direction)-second direction (Y direction) plane, the cut surface may cut a central portion of the body 100 in the third direction (Z direction). The location of the cut surface is not limited to these examples, and one of ordinary skill may select the cut surface at other locations in the body 100, if needed. If necessary, multiple measurements may be performed at different or the same locations in the cut surface so that the thickness, width, and length of a targeted element or the distance between targeted points may be obtained by averaging the multiple measurements. Alternatively, the measured dimension may be the maximum value or the minimum value of the multiple measurements. Alternatively, the measured dimension may be a value of a single measurement at a measured region, which may be set by one of ordinary skill in the art. In one example, a scanning electron microscope (SEM) may be used in the measurement, although the present disclosure is not limited thereto. Other methods and/or tool s appreciated by one of ordinary skill in the art, even if not described in the present disclosure, may also be used.

An insulating layer IF may be disposed between the coil portion 300 and the body 100 and between the support substrate 200 and the body 100. The insulating layer IF may be formed along a surface of the support substrate 200 on which the coil patterns 311 and 312 and the lead-out patterns 331 and 332 are formed. The insulating layer IF may be provided to insulate the coil portion 300 and the body 100, and may include a known insulating material such as parylene, but the present disclosure is not limited thereto. As another example, the insulating layer IF may include an insulating material such as an epoxy resin other than parylene. The insulating layer IF may be formed by vapor deposition, but the present disclosure is not limited thereto. As another example, the insulating layer IF may be formed by laminating and curing an insulating film for forming the insulating layer IF on both surfaces of the support substrate 200 on which the coil portion 300 is formed. Alternatively, the insulating layer IF may be formed by applying and curing an insulating paste for forming an insulating layer IF on both surfaces of the support substrate 200 on which the coil portion 300 is formed. The insulating layer IF may be formed to fill a separation space between turns of the coil portion 300.

The first and second external electrodes 400 and 500 may be disposed on the sixth surface 106 of the body 100 to be spaced apart from each other. In the present embodiment, the first and second external electrodes 400 and 500 may respectively cover the first and second surfaces 101 and 102 of the body 100, and may extend to at least a portion of each of the third to sixth surfaces 101, 102, 103, 104, 105, and 106 of the body 100. Specifically, the first external electrode 400 may cover the first surface 101 of the body 100 to be in contact with and connected to the first lead-out pattern 331 exposed to the first surface 101 of the body 100, and may extend from the first surface 101 of the body 100 to at least a portion of each of the third to sixth surfaces 103, 104, 105, and 106 of the body 100. The second external electrode 500 may cover the second surface 102 of the body 100 to be in contact with and connected to the second lead-out pattern 332 exposed to the second surface 102 of the body 100, and may extends from the second side 102 of 100) to at least a portion of each of the third to sixth sides 103, 104, 105, 106 of the body 100. The shapes of the first and second external electrodes 400 and 500 illustrated in FIG. 1 are only exemplary, so that the present disclosure is not limited thereto. As an example, the first external electrode 400 may cover at least a portion of the first surface 101 of the body 100 to be in contact with the first lead-out pattern 331, and may have a shape extending to only the sixth surface, among the third to sixth surfaces 103, 104, 105, and 106 of the body 100, for example, an "L" shape. Alternatively, the first external electrode 400 may cover at least a portion of the first surface 101 of the body 100 to be in contact with the first lead-out pattern 331, and may have a shape extending to only the fifth and sixth surfaces 105 and 106, among the third to sixth surfaces 103, 104, 105, and 106 of the body 100, for example, a "[" shape.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto. Each of the external electrodes 400 and 500 may be formed in a single-layer structure or a multilayer structure. For example, the first external electrode 400 may include a first layer, disposed on the body 100, and a second layer disposed on the first layer. The first layer may be a copper (Cu) plating layer or a conductive resin layer. The conductive resin layer may be formed by applying a conductive paste, in which conductive powder particles including copper (Cu) and/or silver (Ag) are dispersed in a resin, and curing the applied conductive paste. The second layer may include nickel (Ni) and tin (Sn). The second layer may include, for example, a nickel plating layer disposed on the first layer and including nickel (Ni), and a tin plating layer disposed on the nickel plating layer and including tin (Sn). However, the present disclosure is not limited thereto.

Figure 5:
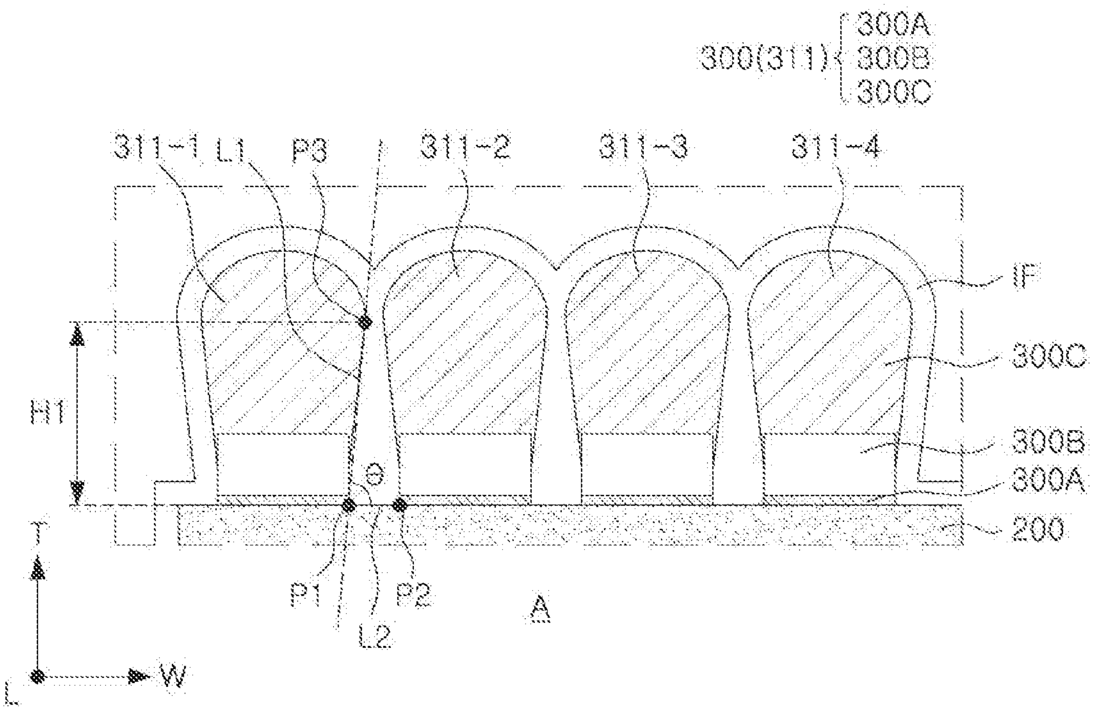
FIG. 5 is a schematic enlarged view illustrating another example of portion 'A' of FIG. 3.

FIG. 5 is a schematic enlarged view illustrating another example of portion 'A' of FIG. 3.

Referring to FIG. 5, in another embodiment, a coil portion 300 may include a conductive thin film 300A, a conductive pattern layer 300B, and an upper conductive layer 300C. The upper conductive layer 300C may be disposed on the conductive pattern layer 300B to cover at least a portion of a side surface of the conductive pattern layer 300B, and may be spaced apart from a support substrate 200 to expose the side surface of the conductive thin film 300A.

As a result, in the present embodiment, an outline of each turn may include a combination of surfaces of the conductive thin film 300A, the conductive pattern layer 300B, and the upper conductive layer 300C, unlike the above-described embodiment of FIG. 4 in which only the surface of the upper conductive layer 300C form an outline of each turn. For example, a region uncovered with the upper conductive layer 300C, of both side surfaces of the conductive thin film 300A and both side surfaces of the conductive pattern layer 300B, may form each turn of the present embodiment together with an surface of the upper conductive layer 300C.

In the present embodiment, points P1 and P2 may be defined as follows: P1 is one point (a point disposed to the right, based on a direction of FIG. 5) of two points formed by contacting both side surfaces of the conductive thin film 300A of a first turn 311-1 with the support substrate 200, and P2 is a point (a point disposed to the left, based on the direction of FIG. 5), facing the point P1, of two points formed by contacting two side surface of the conductive thin film 300A of a second turn 311-2, adjacent to the first turn 311-1, with the support substrate 200. A point P3, first and second virtual segments L1 and L2, and lengths 'a' and 'b' of the first and second virtual segments L1 and L2 may be defined in the same manner as in the above-described embodiment of FIG. 4, and thus, descriptions thereof will be omitted.

In the present embodiment, the upper conductive layer may be disposed on the conductive pattern layer 300B to cover at least a portion of the side surface of the conductive pattern layer 300B and to expose the side surface of the conductive thin film 300A, unlike the above-described embodiment of FIG. 4. As a result, in the present embodiment, an insulating layer IF may be in contact with at least a portion of the side surface of each other conductive thin film 300A and the conductive pattern layer 300B, unlike the above-described embodiment of FIG. 4.

Figure 6:
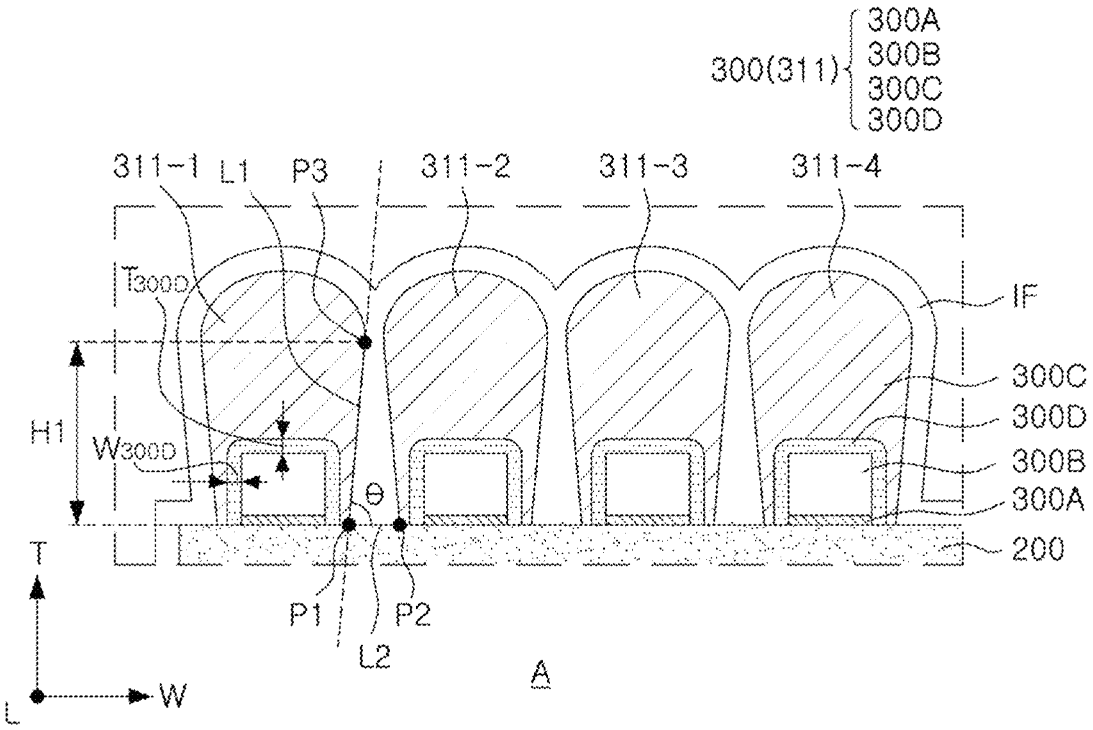
FIG. 6 is a schematic enlarged view illustrating another example of portion 'A' of FIG. 3.
Figure 7:
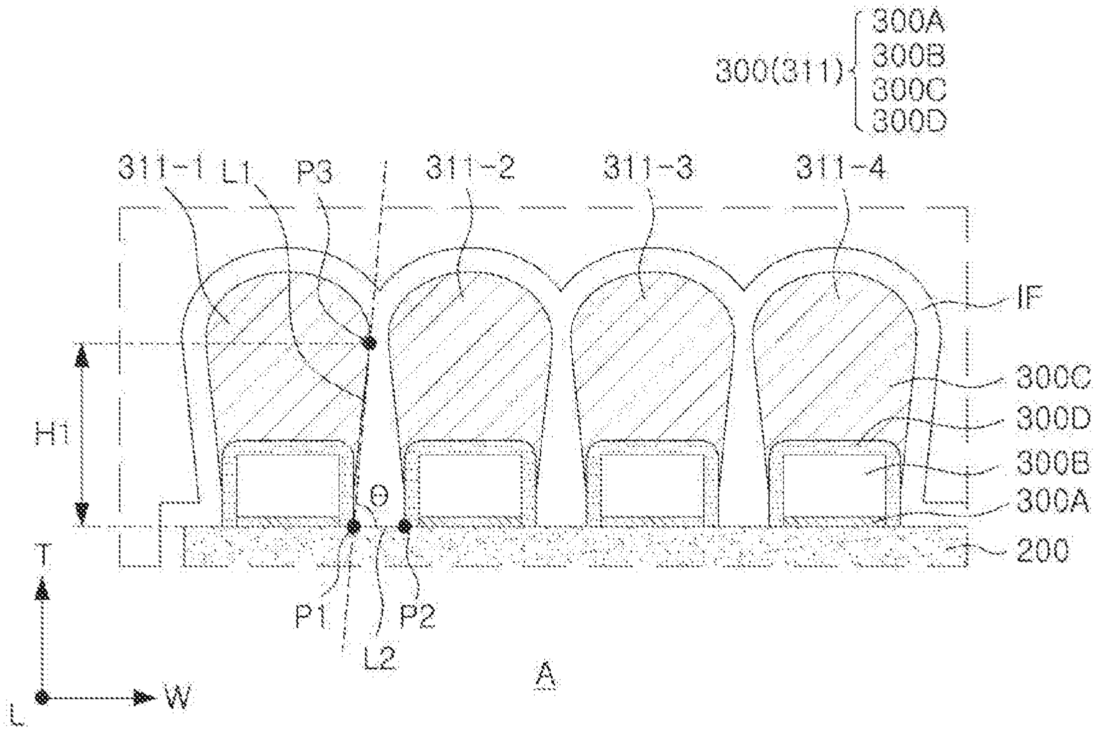
FIG. 7 is a schematic enlarged view illustrating another example of portion 'A' of FIG. 3.

FIG. 6 is a schematic enlarged view illustrating another example of portion 'A' of FIG. 3. FIG. 7 is a schematic enlarged view illustrating another example of portion 'A' of FIG. 3.

Referring to FIGS. 4 and 6, a coil portion 300, applied to the embodiment illustrated in FIG. 6, may further include a conductive surface layer 300D, as compared with the embodiment illustrated in FIG. 4. Referring to FIGS. 5 and 7, a coil portion 300, applied to an embodiment illustrated in FIG. 7, may further include a conductive surface layer 300D, as compared with the embodiment illustrated in FIG. 5. Accordingly, when the embodiments illustrated in FIGS. 6 and 7 are described, a detailed description will be provided as to only the surface conductive layers 300D, a difference from the embodiments illustrated in FIGS. 4 and 5. The other elements of the elements illustrated in FIG. 6, other than the conductive surface layer 300D, may be described by applying the description of the embodiment illustrated in FIG. 4, and the other elements of the elements illustrated in FIG. 7, other than the conductive surface layer 300D, may be described by applying the description of the embodiment illustrated in FIG. 5, and thus, the descriptions of the other elements of FIGS. 6 and 7 will be omitted.

Referring to FIGS. 6 and 7, each of the coil portions 300 applied to the embodiments illustrated in FIGS. 6 and 7 may include a conductive thin film 300A, a conductive pattern layer 300B, and an upper conductive layer 300C, and may further include a surface conductive layer 300D. The surface conductive layer 300D may be disposed on the conductive pattern layer 300B, and may cover side surfaces of the conductive thin film 300A and the conductive pattern layer 300B to be in contact with a support substrate 200. In the present embodiments, the upper conductive layer 300C may be disposed on the surface conductive layer 300D and may cover at least a portion of a side surface of the surface conductive layer 300D.

The conductive surface layer 300D may be formed through an electroplating process using the conductive pattern layer 300B as a seed layer. The conductive surface layer 300D may have an isotropic shape in which a thickness $T_{300D}$ of a region, disposed on an upper surface of the conductive pattern layer 300B, and a width $W_{300D}$ of a region, disposed on a side surface of the conductive pattern layer 300B, are substantially the same. The isotropic shape of the surface conductive layer 300D may be implemented by performing an isotropic plating process using the conductive pattern layer 300B as a seed layer, but the present disclosure is not limited thereto. When the surface conductive layer 300D is formed by isotropic plating, a separation distance between conductive pattern layers 300B of adjacent turns may be reduced using the conductive surface layer 300B to increase the volume of the coil portion 300. In addition, when the conductive surface layer 300D is formed by the isotropic plating, the conductive surface layer 300D may also be formed on a side of an upper surface of the conductive pattern layer 300B, so that a seed structure for forming the upper conductive layer 300C may be formed to have a relatively large height, as compared with the case in which the surface conductive layer 300D is absent. As a result, a final coil structure formed to the upper conductive layer 300C may have a relatively large height, as compared with the case in which the surface conductive layer 300D is absent. The surface conductive layer 300D may be include at least one of, for example, copper (Cu), aluminum (Al), silver (Ag), gold (Au), tin (Sn), molybdenum (Mo), nickel (Ni), titanium (Ti), and chromium (Cr).

In the embodiment illustrated in FIG. 6, the upper conductive layer 300C may cover an entire side surface of the conductive surface layer 300D to be in contact with the support substrate 200. In the embodiment illustrated in FIG. 7, the upper conductive layer 300C may be spaced apart from the support substrate 200 to expose at least a portion of a side surface of the conducive surface layer 300D.

In the embodiment illustrated in FIG. 6, an outline of each turn of the coil portion 300 may include only a surface of the upper conductive layer 300C. In the embodiment illustrated in FIG. 7, an outline of each turn of the coil portion 300 may include a combination of a region, uncovered with the upper conductive layer 300C, of both side surfaces of the conductive surface layer 300D and a surface of the upper conductive layer 300C.

As described above, when a coil is formed through a plating process, a plating growth angle of a plating layer may be controlled such that the coil portion has a height of 100 μm or more.

While exemplary embodiments have been shown and described above, it will be apparent to those skilled in the art that modifications and variations could be made without departing from the scope of the present disclosure as defined by the appended claims.

What is claimed is:

1. A coil component comprising:
a body;
a support substrate disposed in the body;
a coil portion having at least one turn on one surface of the support substrate; and
a first external electrode and a second external electrode disposed on the body to be spaced apart from each other and respectively connected to the coil portion,
wherein 100 μm≤0.5*b*tan θ,
where, on a cross-section perpendicular to the one surface of the support substrate, 'P1' is a point among points at which an outline of a first turn of the coil portion and the one surface of the support substrate intersect, 'P2' is a point facing the point P1 among points at which an outline of a second turn adjacent to the first turn and the one surface of the support substrate intersect, 'P3' is a point, facing the second turn, on the outline of the first turn among points at which the first turn has a maximum line width, 'a' is a length of a first virtual segment connecting the points P1 and P3 to each other, 'b' is a length of a second virtual segment connecting the points P1 and P2 to each other, and θ is an angle defined by the first and second virtual segments, and
wherein the angle θ is 84.3° or more and 89.0° or less.

2. The coil component of claim 1, wherein the coil portion includes a conductive thin film disposed on the support substrate, a conductive pattern layer disposed on the conductive thin film to be spaced apart from the support substrate, and an upper conductive layer disposed on the conductive pattern layer to cover at least a portion of a side surface of the conductive pattern layer, and
wherein, on a cross-section perpendicular to the one surface of the support substrate, a thickness of a region, disposed on an upper surface of the conductive pattern layer, of the upper conductive layer is greater than a width of a region, disposed on the side surface of the conductive pattern layer, of the upper conductive layer.

3. The coil component of claim 2, wherein the upper conductive layer covers a side surface of each of the conductive thin film and the conductive pattern layer and is in contact with the support substrate.

4. The coil component of claim 2, wherein the upper conductive layer is spaced apart from the support substrate to expose at least a portion of a side surface of the conductive thin film.

5. The coil component of claim 1, wherein the coil portion includes a conductive thin film disposed on the support substrate, a conductive pattern layer disposed on the conductive thin film to be spaced apart from the support substrate, a conductive surface layer coating a surface of the conductive pattern layer, and an upper conductive layer disposed on the conductive surface layer to cover at least a portion of a side surface of the conductive surface layer, and
wherein, on a cross-section perpendicular to the one surface of the support substrate, a thickness of a region, disposed on an upper surface of the conductive surface layer, of the upper conductive layer is greater than a width of a region, disposed on the side surface of the conductive surface layer, of the upper conductive layer.

6. The coil component of claim 5, wherein the conductive surface layer covers a side surface of each of the conductive thin film and the conductive pattern layer to be in contact with the support substrate.

7. The coil component of claim 6, wherein the upper conductive layer is in contact with the support substrate.

8. The coil component of claim 5, wherein the upper conductive layer is spaced apart from the support substrate to expose at least a portion of the side surface of the conductive surface layer.

9. The coil component of claim 1, wherein the length 'b' is 6 μm or more and 20 μm or less.

10. A coil component comprising:
a body;
a support substrate disposed in the body;
a coil portion having at least one turn on one surface of the support substrate; and
a first external electrode and a second external electrode disposed on the body to be spaced apart from each other and respectively connected to the coil portion,
wherein a portion of the at least one turn of the coil portion, that is in contact with the support substrate, has a side surface angled less than 90° with the one surface of the support substrate, and
wherein the angle of the side surface is 84.3° or more and 89.0° or less.

11. The coil component of claim 10, wherein the coil portion includes a conductive thin film disposed on the support substrate, a conductive pattern layer disposed on the conductive thin film to be spaced apart from the support substrate, and an upper conductive layer disposed on the conductive pattern layer to cover at least a portion of a side surface of the conductive pattern layer.

12. The coil component of claim 11, wherein, on a cross-section perpendicular to the one surface of the support substrate, a thickness of a region, disposed on an upper surface of the conductive pattern layer, of the upper conductive layer is greater than a width of a region, disposed on the side surface of the conductive pattern layer, of the upper conductive layer.

13. The coil component of claim 11, wherein the upper conductive layer covers a side surface of each of the conductive thin film and the conductive pattern layer and is in contact with the support substrate.

14. The coil component of claim 11, wherein the coil portion further includes a conductive surface layer coating a surface of the conductive pattern layer and disposed between the upper conductive layer and the conductive pattern layer, and
wherein the conductive surface layer extends along a side surface of each of the conductive thin film and the conductive pattern layer to be in contact with the support substrate.

15. The coil component of claim 14, wherein the upper conductive layer covers at least a portion of a side surface of the conductive surface layer, and wherein, on a cross-section perpendicular to the one surface of the support substrate, a thickness of a region, disposed on an upper surface of the conductive surface layer, of the upper conductive layer is greater than a width of a region, disposed on the side surface of the conductive surface layer, of the upper conductive layer.

16. The coil component of claim 15, wherein the upper conductive layer extends along an entirety of the side surface of the conductive surface layer and is in contact with the support substrate.

17. The coil component of claim 11, wherein an upper surface of the conductive pattern layer is a substantially flat surface, and an upper surface of the upper conductive layer is a curved surface.

18. The coil component of claim 10, further comprising an insulating layer disposed between the coil portion and the body and between the support substrate and the body, wherein the insulating layer extends along a portion of the one surface of the support substrate on which lead-out patterns of the coil portion are disposed, the lead-out patterns being disposed at opposing end portions of the coil portion and exposed from the body to be connected to the first and second external electrodes, and wherein the insulating layer is disposed to fill a separation space between adjacent turns of the coil portion.

19. A coil component comprising:

a body;

a support substrate disposed in the body;

a coil portion having at least one turn on one surface of the support substrate; and a first external electrode and a second external electrode disposed on the body to be spaced apart from each other and respectively connected to the coil portion, wherein the coil portion includes a conductive thin film disposed on the support substrate, a conductive pattern layer disposed on the conductive thin film to be spaced apart from the support substrate, a conductive surface layer coating a surface of the conductive pattern layer, and an upper conductive layer disposed on the conductive surface layer to cover at least a portion of a side surface of the conductive surface layer, wherein, on a cross-section perpendicular to the one surface of the support substrate, the conductive surface layer has an isotropic shape in which a thickness of a region, disposed on an upper surface of the conductive pattern layer, and a width of a region, disposed on a side surface of the conductive pattern layer, are the same as each other, and wherein the conductive surface layer is in contact with a side surface of the conductive pattern layer and a side surface of the conductive thin film.

20. The coil component of claim 19, wherein the upper conductive layer is spaced apart from the support substrate to expose at least a portion of a side surface of the conductive surface layer.

* * * * *